(12) United States Patent
Thompson et al.

(10) Patent No.: US 10,488,286 B2
(45) Date of Patent: *Nov. 26, 2019

(54) SYSTEM AND METHOD FOR MEASUREMENT INCORPORATING A CRYSTAL OSCILLATOR

(75) Inventors: M. Clark Thompson, Los Alamos, NM (US); Dipen N. Sinha, Los Alamos, NM (US); Don M. Coates, Santa Fe, NM (US); Jacobo R. Archuletta, Espanola, NM (US); Manuel E. Gonzalez, Kingwood, TX (US)

(73) Assignees: CHEVRON U.S.A. INC., San Ramon, CA (US); LOS ALAMOS NATIONAL SECURITY LLC, Los Alemos, CA (US)

( * ) Notice: Subject to any disclaimer, the term of this patent is extended or adjusted under 35 U.S.C. 154(b) by 1346 days.

This patent is subject to a terminal disclaimer.

(21) Appl. No.: 12/627,639

(22) Filed: Nov. 30, 2009

(65) Prior Publication Data

US 2011/0128003 A1 Jun. 2, 2011

(51) Int. Cl.
*E21B 47/06* (2012.01)
*G01L 9/00* (2006.01)
(Continued)

(52) U.S. Cl.
CPC .......... *G01L 9/0022* (2013.01); *E21B 47/06* (2013.01); *E21B 47/122* (2013.01); *G01D 3/022* (2013.01);
(Continued)

(58) Field of Classification Search
CPC ...... E21B 47/06; E21B 47/065; E21B 47/122; E21B 21/08; G01L 9/0008; G01L 9/001;
(Continued)

(56) References Cited

U.S. PATENT DOCUMENTS 3,320,579 A 5/1967 Abbott
3,562,741 A 2/1971 McEvoy et al.
(Continued)

FOREIGN PATENT DOCUMENTS

DE 10245425 4/2003
EP 0314654 5/1989
(Continued)

OTHER PUBLICATIONS

Definition for the term detector, obtained from The American Heritage Dictionary, https://www.ahdictionary.com/word/search.html?q=detector, obtained on Sep. 25, 2014, 2 pages.*
(Continued)

*Primary Examiner* — David M Schindler
(74) *Attorney, Agent, or Firm* — Pillsbury Winthrop Shaw Pittman, LLP

(57) ABSTRACT

A system, method and device for interrogating a downhole environment in a borehole beneath a surface includes a source of electromagnetic energy, operable to transmit an electromagnetic signal in the borehole, a sensor module, including a passive resonating circuit including a crystal oscillator having a resonant frequency that varies with changes in the condition in the downhole environment to reflect the electromagnetic signal and to modulate the electromagnetic signal in response to a condition in the downhole environment in the borehole and a detector positionable to receive the reflected modulated electromagnetic signal.

11 Claims, 3 Drawing Sheets

(51) Int. Cl.
   *E21B 47/12* (2012.01)
   *G01D 3/02* (2006.01)
   *G01D 5/48* (2006.01)
   *G01D 18/00* (2006.01)
   *G01K 7/32* (2006.01)

(52) U.S. Cl.
   CPC ............ *G01D 5/48* (2013.01); *G01D 18/008* (2013.01); *G01K 7/32* (2013.01)

(58) Field of Classification Search
   CPC ... G01L 9/0016; G01L 9/0022; G01L 9/0023; G01L 9/0025; G01L 9/0052; G01L 9/008; G01L 1/16; G01L 1/162; G01L 1/18; G01L 1/183; G01L 5/0019; G01L 5/167; G01L 23/10; G01K 7/32; G01V 1/159; G01V 7/005; G01D 3/022; G01D 5/48; G01D 18/008
   USPC ......................................................... 324/337
   See application file for complete search history.

(56) References Cited

U.S. PATENT DOCUMENTS

| | | | |
|---|---|---|---|
| 3,968,694 A * | 7/1976 | Clark | 73/724 |
| 4,023,136 A | 5/1977 | Lamensdorf et al. | 340/18 NC |
| 4,160,970 A | 7/1979 | Nicolson | 340/18 LD |
| 4,218,507 A | 8/1980 | Deffeyes et al. | 428/328 |
| 4,275,598 A * | 6/1981 | Engl | 73/622 |
| 4,281,289 A | 7/1981 | Donaldson et al. | |
| 4,308,499 A | 12/1981 | Thierbach et al. | 324/337 |
| 4,415,895 A | 11/1983 | Flagg | |
| 4,430,577 A | 2/1984 | Bouquet | 307/108 |
| 4,839,644 A | 6/1989 | Safinya et al. | 340/854 |
| 4,845,378 A | 7/1989 | Garbe et al. | 307/106 |
| 4,849,699 A | 7/1989 | Gill et al. | |
| 5,066,916 A | 11/1991 | Rau | |
| 5,150,067 A | 9/1992 | McMillan | 328/64 |
| 5,302,879 A | 4/1994 | Totty et al. | |
| 5,355,714 A | 10/1994 | Suzuki et al. | 73/146.5 |
| 5,423,222 A | 6/1995 | Rudd et al. | 73/779 |
| 5,451,873 A | 9/1995 | Freedman et al. | 324/303 |
| 5,467,083 A | 11/1995 | McDonald et al. | 340/854.6 |
| 5,546,810 A | 8/1996 | Arikawa et al. | |
| 5,576,703 A | 11/1996 | MacLeod et al. | 340/854.4 |
| 5,587,707 A | 12/1996 | Dickie et al. | 340/870.09 |
| 5,680,029 A | 10/1997 | Smits et al. | 320/2 |
| 5,686,779 A | 11/1997 | Vig | 310/366 |
| 5,751,895 A | 5/1998 | Bridges | |
| H1744 H | 8/1998 | Clayton et al. | 374/117 |
| 5,821,129 A | 10/1998 | Grimes et al. | 436/151 |
| 5,917,160 A | 6/1999 | Bailey | |
| 5,936,913 A | 8/1999 | Gill et al. | 367/25 |
| 5,942,991 A | 8/1999 | Gaudreau et al. | 340/870.16 |
| 6,025,725 A | 2/2000 | Gershenfeld et al. | 324/652 |
| 6,209,640 B1 | 4/2001 | Reimers et al. | |
| 6,234,257 B1 | 5/2001 | Ciglenec et al. | 175/50 |
| 6,393,921 B1 | 5/2002 | Grimes et al. | 73/728 |
| 6,434,372 B1 | 8/2002 | Neagley et al. | 455/106 |
| 6,489,772 B1 | 12/2002 | Holladay et al. | |
| 6,594,602 B1 * | 7/2003 | Schultz | 702/104 |
| 6,598,481 B1 | 7/2003 | Schultz | |
| 6,633,236 B2 | 10/2003 | Vinegar et al. | 340/854.4 |
| 6,670,880 B1 | 12/2003 | Hall et al. | 336/132 |
| 6,766,141 B1 | 7/2004 | Briles et al. | 455/40 |
| 6,993,432 B2 | 1/2006 | Jenkins et al. | 702/13 |
| 7,017,662 B2 | 3/2006 | Schultz et al. | 166/254.2 |
| 7,114,561 B2 | 10/2006 | Vinegar et al. | 166/250.01 |
| 7,158,049 B2 | 1/2007 | Hoefel et al. | 340/855.7 |
| 7,168,487 B2 | 1/2007 | Salamitou et al. | 166/250.11 |
| 7,180,826 B2 | 2/2007 | Kusko et al. | 367/85 |
| 7,256,707 B2 | 8/2007 | Clark et al. | 340/854.4 |
| 7,397,388 B2 | 7/2008 | Huang et al. | 340/853.3 |
| 7,548,068 B2 | 6/2009 | Rawle et al. | 324/534 |
| 7,636,052 B2 * | 12/2009 | Coates et al. | 340/854.6 |
| 2002/0157895 A1 | 10/2002 | Dubinsky et al. | |
| 2002/0195247 A1 | 12/2002 | Ciglenec et al. | |
| 2003/0010492 A1 | 1/2003 | Hill et al. | |
| 2003/0053516 A1 | 3/2003 | Atherton | |
| 2003/0101822 A1 | 6/2003 | Atherton | |
| 2003/0102995 A1 | 6/2003 | Stolarczyk et al. | |
| 2005/0110655 A1 | 5/2005 | Layton | |
| 2006/0266109 A1 | 11/2006 | DiFoggio | |
| 2007/0030762 A1 | 2/2007 | Huang et al. | 367/83 |
| 2007/0040557 A1 | 2/2007 | Johnstad et al. | |
| 2007/0107528 A1 | 5/2007 | Schroeder et al. | 73/779 |
| 2007/0206440 A1 | 9/2007 | Fripp et al. | 367/81 |
| 2007/0235184 A1 | 10/2007 | Thompson et al. | |
| 2008/0061789 A1 | 3/2008 | Coates et al. | 324/333 |
| 2008/0062036 A1 | 3/2008 | Funk et al. | |
| 2008/0184787 A1 | 8/2008 | Coates et al. | 73/152.12 |
| 2008/0185142 A1 * | 8/2008 | Pelletier | 166/250.01 |
| 2008/0185328 A1 | 8/2008 | Stefanini | 210/222 |
| 2008/0187025 A1 | 8/2008 | Coates et al. | 374/184 |
| 2008/0253230 A1 | 10/2008 | Thompson et al. | |
| 2008/0264624 A1 | 10/2008 | Hall et al. | 166/66.5 |
| 2008/0285619 A1 | 11/2008 | Thompson et al. | |
| 2009/0031796 A1 | 2/2009 | Coates et al. | |
| 2009/0159361 A1 | 6/2009 | Coates et al. | 181/106 |
| 2009/0174409 A1 | 7/2009 | Coates et al. | |
| 2011/0022336 A1 * | 1/2011 | Coates et al. | 702/50 |

FOREIGN PATENT DOCUMENTS

| | | |
|---|---|---|
| EP | 1434063 | 6/2004 |
| GB | 2386691 | 9/2003 |
| GB | 2425593 | 11/2006 |
| WO | 01/73380 A1 | 10/2001 |
| WO | 01/75410 A1 | 10/2001 |
| WO | 02/93126 A2 | 11/2002 |
| WO | 02093126 A2 | 11/2002 |
| WO | 2004003329 A2 | 1/2004 |

OTHER PUBLICATIONS

Defintiion for the term sensor, Books/Definitions Electrical Engineering Dictionary, Ed. Phiilip A. Laplante, 2000, 2 pages.*

Goswami et al., On Subsurface Wireless Data Acquisition System, IEEE Transactions on Geoscience and Remote Sensing, vol. 43, No. 10, Oct. 2005.

International Search Report and Written Opinion for PCT International Patent Application No. PCT/US2008/075214, dated Oct. 5, 2009.

International Search Report and Written Opinion for PCT International Patent Application No. PCT/US2010/057414, dated Feb. 22, 2011.

International Search Report and Written Opinion for PCT International Patent Application No. PCT/US2007/077866, dated Mar. 30, 2009.

Chinese Office Action dated Feb. 8, 2014 for 201080061121.7.

International Preliminary Report and Written Opinion regarding PCT/US2010/057414, dated Jun. 6, 2012.

Chinese Office Action dated Oct. 22, 2014 for Appln. No. 201080061121.7.

Patent Office of the Cooperation Council for the Arab States of the Gulf GCC, Office Action dated Aug. 6, 2014 for Appln. No. 2010-17195.

Chinese Office Action dated May 13, 2015 for Appln. No. 201080061121.7.

Eurasian Office Action dated Jan. 12, 2015 for Appln. No. 201290420/31.

Indonesian Office Action dated Mar. 15, 2016 for Appln. No. WO00201202400.

Eurasian Office Action dated Mar. 11, 2016 for Appln. No. 201290420/31.

* cited by examiner

SYSTEM AND METHOD FOR MEASUREMENT INCORPORATING A CRYSTAL OSCILLATOR

BACKGROUND

Field

The present invention relates generally to remote sensing and more particularly to sensing temperatures and/or pressures using a crystal oscillator based sensor.

Background

In resource recovery, it may be useful to monitor various conditions at locations remote from an observer. In particular, it may be useful to provide for monitoring conditions at or near to the bottom of a borehole that has been drilled either for exploratory or production purposes. Because such boreholes may extend several miles, it is not always practical to provide wired communications systems for such monitoring.

U.S. Pat. No. 6,766,141 (Briles et al) discloses a system for remote down-hole well telemetry. The telemetry communication is used for oil well monitoring and recording instruments located in a vicinity of a bottom of a gas or oil recovery pipe. Modulated reflectance is described for monitoring down-hole conditions.

As described in U.S. Pat. No. 6,766,141, a radio frequency (RF) generator/receiver base station communicates electrically with the pipe. The RF frequency is described as an electromagnetic radiation between 3 Hz and 30 GHz. A down-hole electronics module having a reflecting antenna receives a radiated carrier signal from the RF generator/receiver. An antenna on the electronics module can have a parabolic or other focusing shape. The radiated carrier signal is then reflected in a modulated manner, the modulation being responsive to measurements performed by the electronics module. The reflected, modulated signal is transmitted by the pipe to the surface of the well where it can be detected by the RF generator/receiver.

SUMMARY

An aspect of an embodiment of the present invention includes a source of electromagnetic energy, operable to transmit an electromagnetic signal in the borehole, a sensor module, including a passive resonating circuit including a crystal oscillator having a resonant frequency that varies with changes in the condition in the downhole environment to reflect the electromagnetic signal and to modulate the electromagnetic signal in response to a condition in the downhole environment in the borehole and a detector positionable to receive the reflected modulated electromagnetic signal.

DESCRIPTION OF THE DRAWINGS

Other features described herein will be more readily apparent to those skilled in the art when reading the following detailed description in connection with the accompanying drawings, wherein.

DETAILED DESCRIPTION

Figure 1:
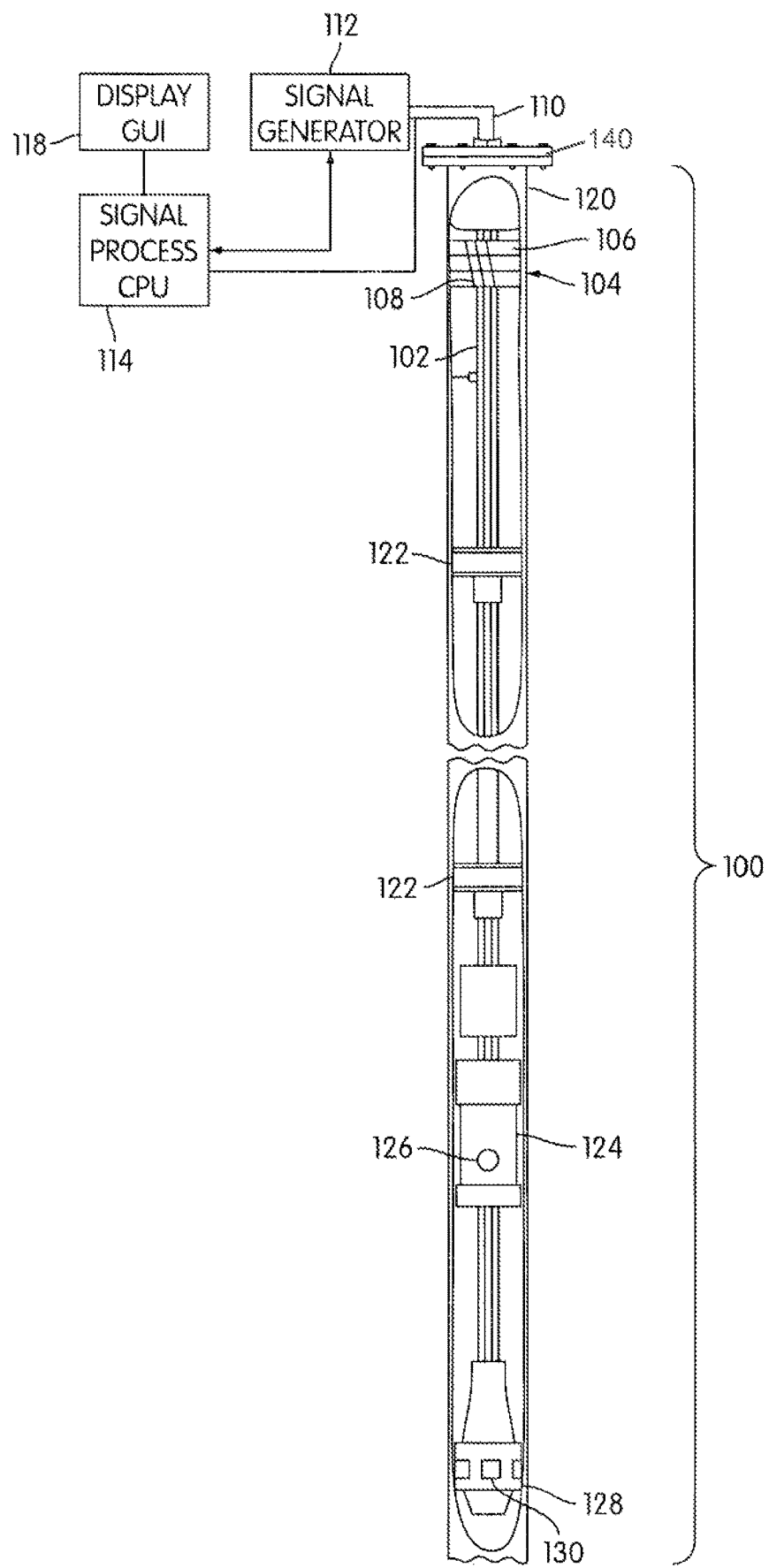
FIG. 1 is a schematic illustration of a system for interrogating a downhole environment in a borehole beneath a surface in accordance with an embodiment of the present invention.

FIG. 1 illustrates an example of an apparatus 100 for monitoring a condition in a subsurface borehole. The apparatus 100 includes an electromagnetically transmissive medium, such as a conductive line 102, for conducting electromagnetic energy through the borehole. It will be appreciated by those having ordinary skill in that art that the conductive line 102 may take different forms or embodiments, depending on the state of the borehole. Thus, for example, the conductive line 102 may comprise a production tubing string in a completed borehole or a drillstring in a borehole under construction. Near the top of the conductive line 102, a transformer 104 is provided to couple the conductive pipe to a source of electromagnetic energy. Alternate coupling methods to the transformer 104 may be employed. For example, the transmission line may directly couple to a coaxial cable or any other suitable cable.

In the example embodiment as shown, the transformer 104 includes a stack of ferrite rings 106, and a wire 108 wound around the rings. The wire 108 includes leads 110 that may be coupled to a signal generator 112 which may be configured to produce a pulsed or a continuous wave signal, as necessary or desirable. The wire 108 may further be coupled to a receiver 114. The receiver 114 may be embodied as a computer that includes a bus for receiving signals from the apparatus 100 for storage, processing and/or display. In this regard, the computer 114 may be provided with a display 118 which may include, for example, a graphical user interface.

The computer 114 may be programmed to process the modulated frequency to provide a measure of the sensed characteristic. The computer 114 may perform any desired processing of the detected signal including, but not limited to, a statistical (e.g., Fourier) analysis of the modulated vibration frequency, a deconvolution of the signal, a correlation with another signal or the like. Commercial products are readily available and known to those skilled in the art that can be used to perform any suitable frequency detection. Alternately, the computer may be provided with a look-up table in memory or in accessible storage, that correlates received modulated frequencies to sensed acoustic energy.

In a typical drilling application, the borehole will be lined with a borehole casing 120 which is used to provide structural support to the borehole. This casing 120 is frequently made from a conductive material such as steel, in which case it will cooperate with the line 102 in order to form a coaxial transmission line, and it is not necessary to provide any additional conductive medium. Where the casing is not conductive, a conductive sleeve (not shown) may be provided within the casing in order to form the coaxial structure. In order to maintain a spacing between the line 102 and the casing 120, the apparatus 100 may include dielectric rings 122 disposed periodically along the conductive line 102.

The spacers can, for example, be configured as insulated centralizers which can be disks formed from any suitable material including, but not limited to, nylon or polytetrafluoroethylene (PTFE). Though the illustrated embodiment makes use of a coaxial transmission line, it is contemplated that alternate embodiments of a transmission line may be employed, such as a single conductive line, paired conductive lines, or a waveguide. For example, the casing alone may act as a waveguide for certain frequencies of electromagnetic waves. Furthermore, lengths of coaxial cable may be used in all or part of the line. Such coaxial cable may be particularly useful when dielectric fluid cannot be used within the casing 120 (e.g., when saline water or other conductive fluid is present in the casing 120).

A probe portion 124 is located near the distal end of the apparatus 100. In principle, the probe portion may be located at any point along the length of the transmission line. Indeed, multiple such probe portions may be placed at intervals along the length, though this would tend to create additional signal processing burdens in order to differentiate signals from the several probes. Setting a natural resonance frequency of each probe at a different frequency would, in principle, allow for a type of wavelength multiplexing on the coaxial line that could simplify the processing.

The probe portion includes a port 126 that is configured to communicate ambient pressures from fluid present in the borehole into the probe where it may be sensed by the sensor (not shown in FIG. 1). Below the probe is illustrated a packer 128 and packer teeth 130.

In use, the signal generator 112 generates an electromagnetic pulse that is transmitted through the transmission line to the probe 124. In an alternate arrangement, the pulse may be generated locally as described in U.S. patent application Ser. No. 11/898,066 which is issued as U.S. Pat. No. 8,390,471, herein incorporated by reference. In one embodiment, as described in U.S. patent application Ser. No. 14/898,066 (U.S. Pat. No. 8,390,471), the wellhead can be grounded via short circuiting of the wellhead flange 140 to common ground. The conductive pipe 102, along with the casing 120, form a coaxial line that serves as a transmission line for communication of the down-hole electronics (probe 124), such as a transducer, with surface electronics, such as the processor (receiver or computer 114).

The probe includes a sensor that includes a resonant circuit portion that, upon receiving the pulse, modulates and re-emits or reflects the pulse back up the transmission line. The resonant circuit may be, for example, a tank circuit that includes inductive and capacitive components.

Figure 2:
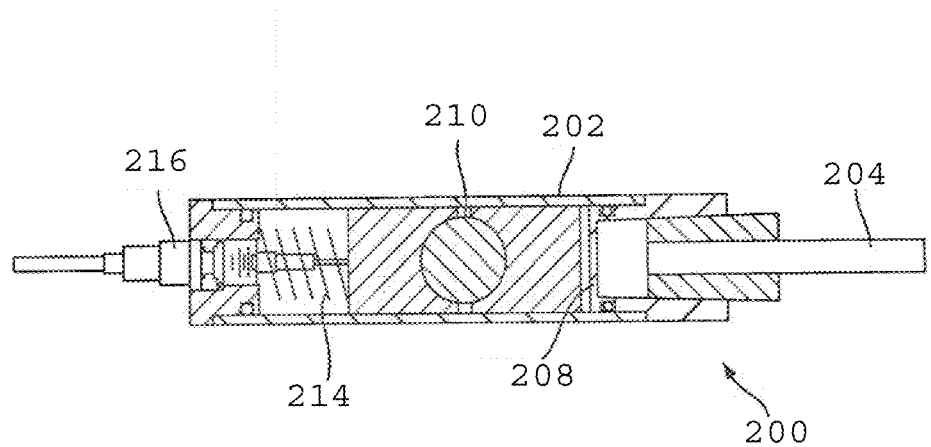
FIG. 2 is a schematic illustration of a sensor package incorporating a pressure or temperature sensor in accordance with an embodiment of the present invention.

In an embodiment, illustrated in FIG. 2, a crystal-based oscillator 200 acts as the L-C tank circuit. The structure of the housing 202 has at one end a pressure feed-in tube 204 that allows pressure from the borehole environment that has entered via the port 126 to pass into an interior space 206 of the sensor 200. In the interior space, the pressure is transmitted to a flexible diaphragm 208 or otherwise pressure-reactive structure.

Motion of the diaphragm 208 is transmitted to a quartz crystal 210, or other piezoelectric crystal such as gallium phosphate. As pressure is transmitted to an edge of the quartz crystal, its resonant frequency changes. By correct selection of a direction of the face of the crystal, the sensor may be made to be more sensitive to pressure or to temperature (e.g., AC-cut). For pressure monitoring, the crystal should be preferentially sensitive to pressure and relatively less sensitive to temperature (e.g., AT-cut). Furthermore, for monitoring of pressure changes with a relatively high frequency response (e.g., monitoring of acoustic frequencies), it is useful for the crystal to be generally relatively thin (e.g., 0.2-2.0 mm) and a typical size is on the order of 1 cm in diameter.

A return spring mechanism 214 may be provided to bias the crystal 210 and its holders towards the feed-in tube 204 and thereby to tend to cause the diaphragm to return to a neutral position. An electrical feed through 216 is provided to couple the sensor 200 to the sensor circuit (not shown).

Figure 3A:
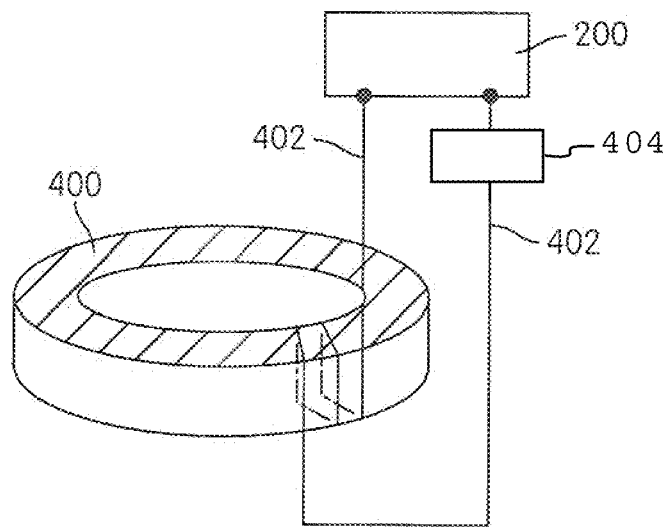
FIG. 3A is a schematic illustration of a circuit incorporating a crystal oscillator based sensor and a capacitive sensor in accordance with an embodiment of the present invention.
Figure 3:
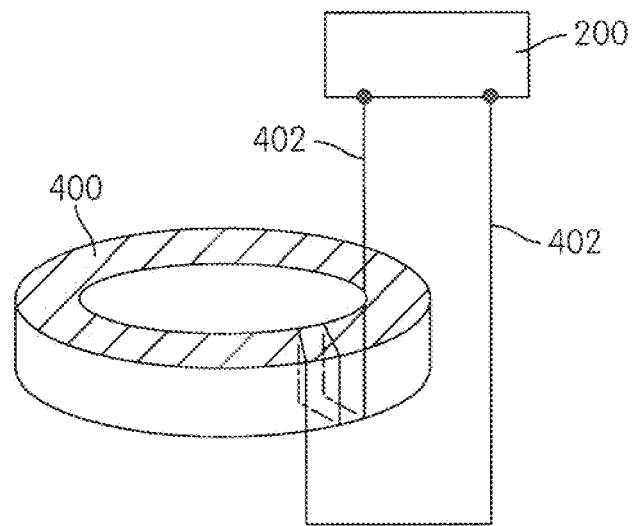
FIG. 3 is a schematic illustration of a circuit incorporating a crystal oscillator based sensor in accordance with an embodiment of the present invention.

The sensor 200 may be coupled to the transmission line via an inductive ferrite ring 400 as illustrated in FIG. 3. Electrical leads 402 are provided through the electrical feed through 216 of the sensor module. The leads 402 couple wire loops around the ferrite ring 400. In this embodiment, the oscillator has the characteristics of an L-C circuit and the ferrite ring essentially acts as a transformer to couple the oscillator to the transmission line.

FIG. 3A illustrates an alternate embodiment directed to a pressure sensor configuration. In this embodiment, the relatively temperature-insensitive crystal (e.g., AT cut crystal) is isolated from the ambient pressure, and a capacitive pressure-responsive element 404 is provided in series with the sensor 200' and exposed to the ambient pressure. In this configuration, the ferrite ring 400 again acts as a transformer, while the capacitive sensor 404 in combination with the crystal sensor 200' acts as the L-C tank circuit. The crystal sensor 200' will resonate with a frequency that depends in large part on the capacitance of the capacitive sensor 404. In this case, the capacitive sensor acts to pull the base frequency of the crystal oscillator as a function of the pressure sensed at the capacitor.

Figure 4:
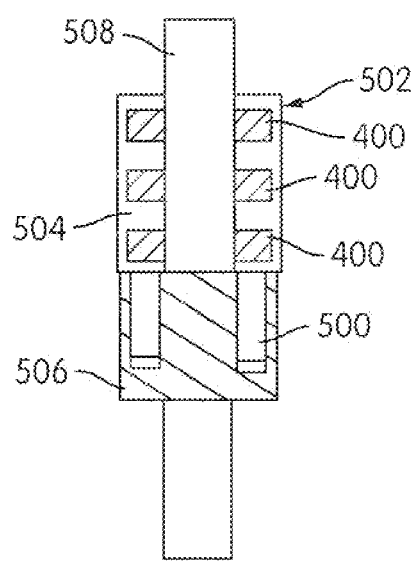
FIG. 4 is a schematic illustration of a package incorporating a plurality of sensors in accordance with one or more embodiments of the present invention.

FIG. 4 illustrates a package for sensors in accordance with embodiments of the present invention. A number of sensors 500 are disposed within a common housing 502. For each sensor 500, there is a corresponding ferrite ring 400, which is disposed in a portion 504 of the housing 502 that is made from a dielectric material, for example PTFE. While ordinarily there will be a one-to-one ratio of sensors to rings, it is also possible to have one ring correspond to two or even more sensors. As described above, the rings 400 couple the sensors to the transmission line 102. The sensors, in turn, are held in a metal block portion 506 of the sensor module. Tubing 508 is threaded into the metal block in order to positively locate the sensor package. In a typical application, this tubing may constitute either the production tubing itself, or an extension of the production string.

As will be appreciated, it is possible to combine pressure and temperature sensors in a single package, such that the temperature measurements may be used to help account for temperature related drift of the pressure sensor.

To account for variations in response that are well-dependent rather than temperature or pressure dependent, a calibration crystal sensor may be included along with the primary sensor. In this approach, the calibration crystal sensor is provided with its own power source, for example a battery. The resulting sensor is isolated from the well impedance, eliminating well-dependent effects. As an example, the sensor circuitry may include transistors that, in part, act to isolate the calibration crystal sensor when under power. Though the battery may be of limited life, it is possible to use measurements from the calibration crystal sensor during the battery lifetime, and then apply the generated calibration data to ongoing measurements after the calibration sensor has expired. In this regard, a calibration curve or calibration lookup table may be generated over the battery lifetime and stored for use in later measurements.

Another approach is to make use of a temperature insensitive crystal that is isolated from the ambient pressure, similar to that used in the pressure sensor of FIG. 3A. In this variation, the crystal signal, isolated from pressure and relatively insensitive to temperature, will only react to the particular electromagnetic transmission characteristics of the well in which it is positioned. Therefore, its output can be regarded as being representative of the well shift only, unaffected by the other environmental factors. As will be appreciated, this approach may be used in conjunction with the powered calibration sensor previously described to provide additional information regarding the nature of the well-shift phenomenon. In this regard, the powered sensor may be used for calibrating the well-shift monitoring crystal sensor during the period in which the power supply is active. Once the power supply is exhausted, then the unpowered well-shift monitoring crystal sensor may continue to be used in accordance with the previously measured and stored calibration information.

Those skilled in the art will appreciate that the disclosed embodiments described herein are by way of example only, and that numerous variations will exist. The invention is limited only by the claims, which encompass the embodiments described herein as well as variants apparent to those skilled in the art.

The invention claimed is:

1. A system for interrogating a downhole environment in a borehole beneath a surface, comprising:
    a source of electromagnetic energy disposed at the surface and configured to transmit an electromagnetic signal in the borehole;
    a sensor module disposed inside the borehole, the sensor module comprising;
    a passive resonating circuit, the passive resonating circuit comprising a crystal oscillator having a resonant frequency that varies with changes in a condition in the downhole environment, the crystal oscillator being configured to reflect the electromagnetic signal and to modulate the electromagnetic signal in response to the condition in the downhole environment in the borehole,
    a power source isolated from the source of electromagnetic energy, and
    a calibration crystal oscillator configured to be in electrical communication with the power source, and configured to modulate a signal from the power source in accordance with the condition in the downhole environment, to produce a calibration signal, wherein the calibration crystal oscillator operably in communication with the power source is substantially electrically isolated from impedance of the borehole so that the calibration signal is substantially free from borehole dependent effects; and
    a receiver disposed at the surface, the receiver being configured to receive and process the reflected modulated electromagnetic signal and the calibration signal,
    wherein the condition comprises a condition selected from the group consisting of temperature, pressure and combinations thereof.

2. A system as in claim 1,
    wherein the receiver comprises a processor, configured and arranged to receive the reflected modulated electromagnetic signal and the calibration signal and, based on the reflected modulated electromagnetic signal and the calibration signal, calculate a calibrated value for the condition in the downhole environment.

3. A system as in claim 1, wherein the crystal oscillator has a face along a crystal direction such that it is relatively more sensitive to changes in pressure than to changes in temperature.

4. A system as in claim 1, wherein the crystal oscillator has a face along a crystal direction such that it is relatively more sensitive to changes in temperature than to changes in pressure.

5. A system as in claim 1, wherein the condition is a pressure in the downhole environment, the crystal oscillator is isolated from ambient pressure and the system further comprises a capacitive pressure sensor in series with the crystal oscillator.

6. A system as in claim 1, wherein the crystal oscillator is mechanically coupled to a pressure-responsive device such that, in use, the pressure in the downhole environment received by the pressure-responsive device is transmitted as a force to an edge of the crystal to change the resonant frequency of the crystal oscillator.

7. A system as in claim 1, wherein the sensor module comprises a further passive resonating circuit comprising a further crystal oscillator, wherein the crystal oscillator is cut along a crystal direction such that it is relatively more sensitive to changes in temperature than to changes in pressure and the further crystal oscillator is cut along a crystal direction such that it is relatively more sensitive to changes in pressure than to changes in temperature.

8. The system as in claim 1, wherein the sensor module further comprises a transmission line, in electrical communication with the calibration crystal oscillator, configured and arranged to transmit the calibration signal to the receiver.

9. The system of claim 1, further comprising a well-shift monitoring crystal sensor disposed inside the borehole,
    wherein the well-shift monitoring crystal sensor is temperature insensitive and substantially isolated from ambient pressure, and the well-shift monitoring crystal sensor is only reactive to electromagnetic transmission characteristics of the borehole in which it is positioned,
    wherein the well-shift monitoring crystal sensor is calibrated using the calibration crystal oscillator during a period in which the power source is active.

10. A method of interrogating a downhole environment in a borehole beneath a surface, comprising:
    transmitting an electromagnetic signal from an electromagnetic source of energy disposed at the surface in the borehole;
    reflecting the electromagnetic signal with a sensor module, comprising a passive resonating circuit, the passive resonating circuit comprising a crystal oscillator having a resonant frequency that varies with changes in a condition in the downhole environment, the sensor module being disposed inside the borehole, wherein the condition comprises a condition selected from the group consisting of temperature, pressure and combinations thereof;
    modulating, by the crystal oscillator, the electromagnetic signal in accordance with the varying resonant frequency in response to the condition in the downhole environment in the borehole;
    modulating, by a calibration crystal oscillator, a signal from a power source isolated from the electromagnetic source of energy in accordance with the condition in the downhole environment, to produce a calibration signal and transmitting the calibration signal, the power source being disposed inside the borehole, the calibration crystal oscillator being substantially electrically isolated from impedance of the borehole so that the calibration signal is substantially free from borehole dependent effects; and receiving and processing at a receiver disposed at the surface the reflected modulated electromagnetic signal and the calibration signal.

11. The method as in claim 10, further comprising calculating a calibrated value for the condition in the downhole environment based on the reflected modulated electromagnetic signal and the calibration signal.

* * * * *